April 21, 1959     O. K. KELLEY ET AL     2,882,545
WINDSHIELD CLEANING APPARATUS
Filed Aug. 3, 1955     5 Sheets-Sheet 1

INVENTORS
Oliver K. Kelley
Gilbert K. Hause
BY Clifford C. Wrigley

Craig V. Morton
Their Attorney

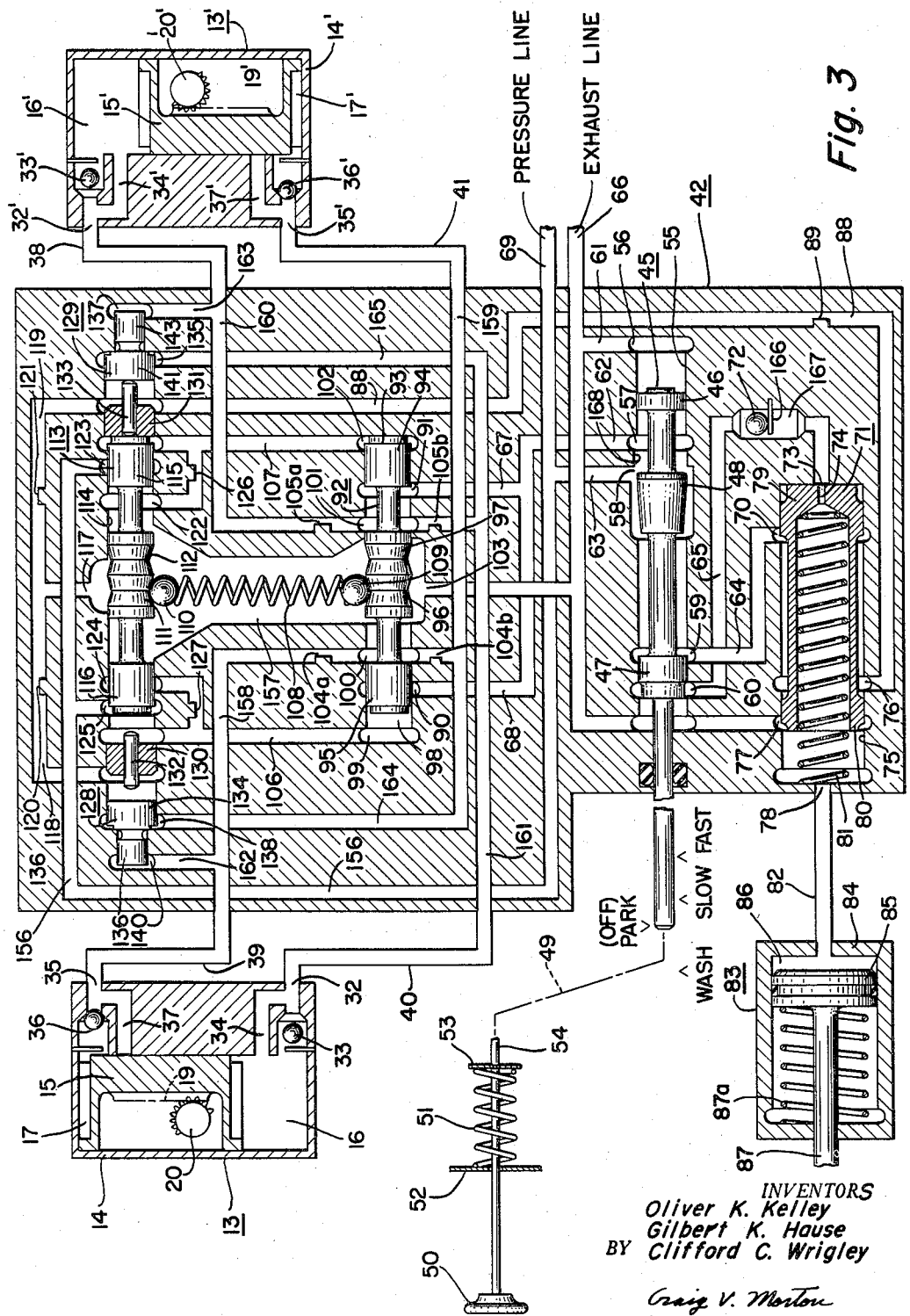

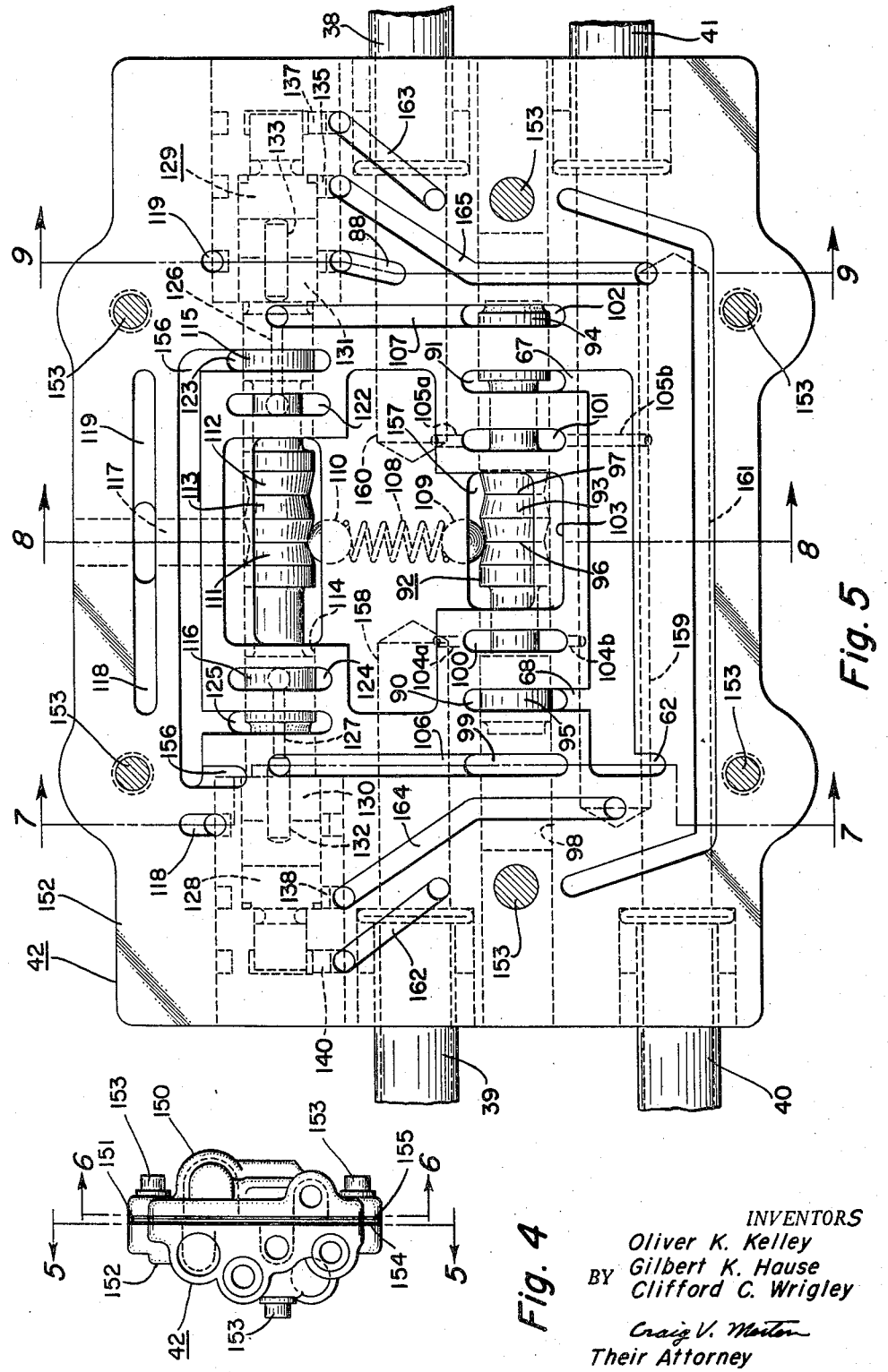

April 21, 1959 O. K. KELLEY ET AL 2,882,545
WINDSHIELD CLEANING APPARATUS
Filed Aug. 3, 1955 5 Sheets-Sheet 4

INVENTORS
Oliver K. Kelley
Gilbert K. Hause
Clifford C. Wrigley
BY
Craig V. Morton
Their Attorney

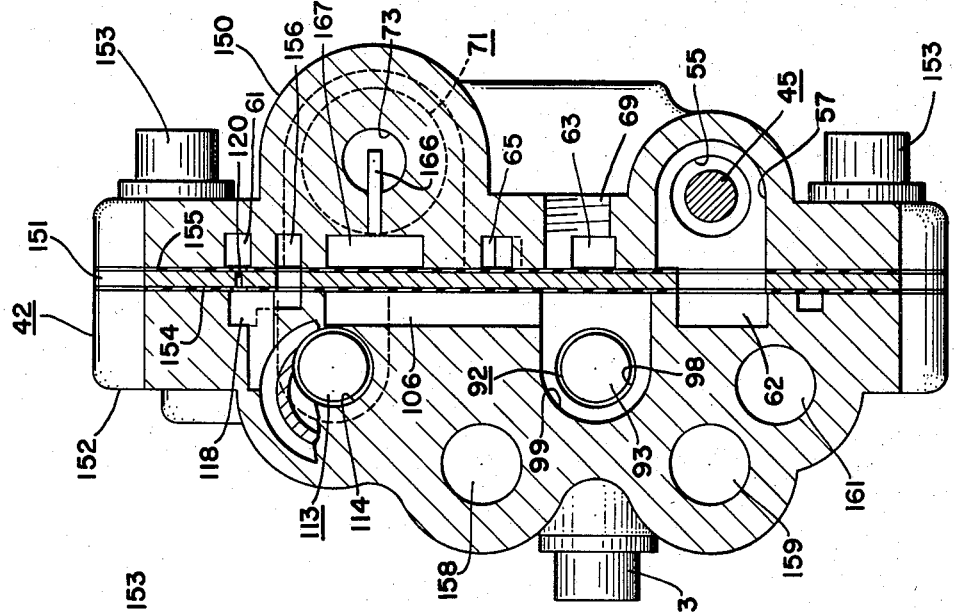
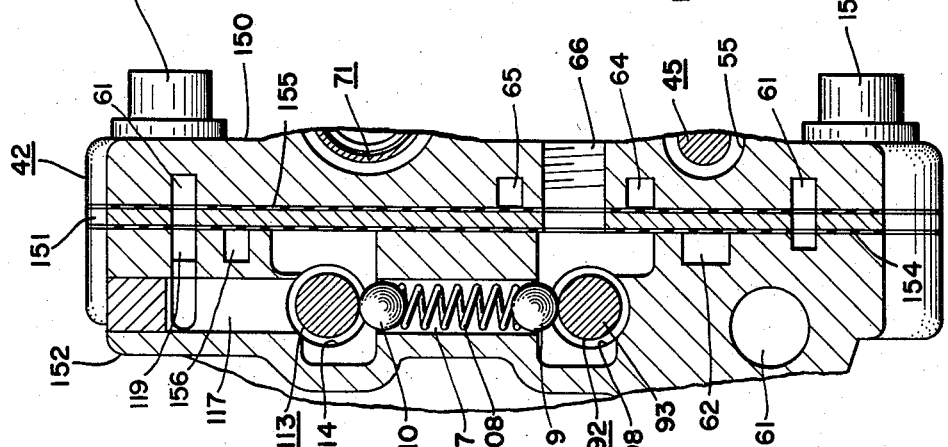
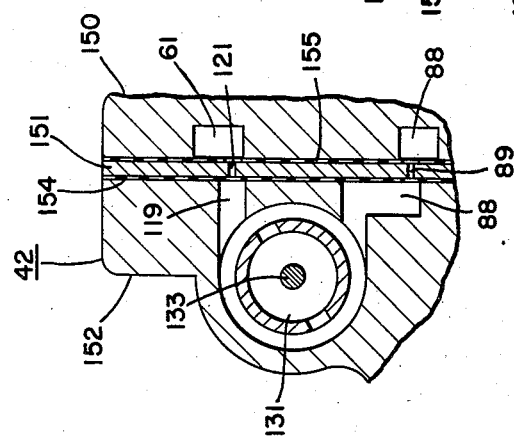
INVENTORS
Oliver K. Kelley
Gilbert K. Hause
Clifford C. Wrigley
BY
Craig V. Morton
Their Attorney

2,882,545
Patented Apr. 21, 1959

United States Patent Office

2,882,545
WINDSHIELD CLEANING APPARATUS

Oliver K. Kelley, Bloomfield Hills, Gilbert K. Hause, Franklin, and Clifford C. Wrigley, Grosse Pointe Woods, Mich., assignors to General Motors Corporation, Detroit, Mich., a corporation of Delaware Application August 3, 1955, Serial No. 526,294

19 Claims. (Cl. 15—250.4)

This invention pertains to the art of windshield cleaning, and particularly to wiper actuating mechanism and coordinated control mechanism for windshield wipers and washers.

Heretofore, it has been proposed to actuate each wiper of a dual wiper vehicle installation by an independent fluid motor. Apparatus of this type is disclosed in our copending application Serial No. 487,196, filed February 9, 1955, now Patent No. 2,847,978. This invention relates to improved wiping apparatus of the aforesaid type, and, in addition, incorporates means for effecting coordinated operation of a washer and a wiper whereby upon initiation of the wash cycle, operation of the wipers will be automatically started and upon completion of the wash cycle, operation of the wipers will be automatically interrupted. Accordingly, among our objects are the provision of windshield wiper actuating mechanism including independent fluid motors for each wiper; the further provision of control valve means for effecting synchronous operation of a plurality of independent fluid motors; and the still further provision of control means for automatically effecting coordinated operation of a washer and a wiper.

The aforementioned and other objects are accomplished in the present invention by incorporating hydraulically operable automatic valve means and a single manually operable valve in the control system. Specifically, each motor comprises a cylinder having disposed therein a reciprocable piston capable of fluid pressure actuation in both directions. The stroke of the motor pistons may be extended in one direction for parking the wiper blades, and each piston is formed with a rack that meshes with a sector gear carried by an oscillatable wiper actuating shaft. Each piston divides its cylinder into two chambers, each chamber being connected to a port through a check valve passage bypassed by a calibrated orifice.

The windshield cleaning apparatus also includes washing mechanism comprising a reservoir, pumping means, and spray nozzles through which liquid solvent may be discharged onto the windshield into the paths of the moving wiper blades. Preferably, although not necessarily, each spray nozzle is carried by an oscillatable wiper shaft and angularly displaced relative to the wiper arm so that the liquid solvent discharged onto the windshield leads wiper movement in one direction and lags wiper movement in the other direction. The washer pump assembly may be of the type disclosed in our copending application Serial No. 487,197, filed February 9, 1955.

The control valve assembly includes reversing valve means, a washer control valve, and a manually operable wiper control valve. The reversing valve means comprise a servo actuated, snap action pilot valve and a servo actuated, snap action reversing valve. The pilot valve is hydraulically loaded to remain at one end of its travel until it is snapped to the other end by reaction pressure from the motors. The reaction pressure from the motors is transmitted to the pilot valve by means of reaction plungers in a manner which will be pointed out more particularly hereinafter. The motor reversing valve is connected through ports and passages with the pilot valve whereby movement of the pilot valve will cause movement of the reversing valve. In addition, the two servo valves are interconnected by over-center toggle spring means which assure snap action movement of the valves.

The washer control valve comprises a spring biased servo actuated plunger having a calibrated orifice therein. When the total pressures acting on opposed surfaces of the plunger are unequal, the plunger will move to compress the spring. During this plunger movement, the washer pump and the wiper motor means will be actuated when the fluid pressures on opposed surfaces of the plunger are equal, operation of the pump is interrupted and the spring will reposition the plunger to interrupt operation of the wiper motor means. The manual control valve comprises a plunger having a throttling land for controlling the speed of wiper operation, and a land for controlling the application of pressure fluid to the washer control valve.

During normal operation, the pilot and reversing valves means will maintain the two motor pistons in a state of continuous reciprocation throughout a predetermined wiping stroke. Moreover, by virtue of the reaction pressure shift control, the motors will be hydraulically synchronized, although one motor can operate independently of the other motor if it should be stalled for any reason. When operation of the wiper motors is interrupted by the manual control valve, pressure fluid is applied to one of the reaction plungers so as to prevent actuation of the pilot valve in one direction whereby the stroke of the motor pistons will be extended to park the wiper blades beyond the normal wiping stroke. To effect coordinated operation of the washers and the wipers, the manual control valve is pulled outwardly whereupon pressure fluid is applied to the washer control valve. Thereafter, the manual control valve is released and the servo washer control valve initiates wiper operation and actuates the pump to supply liquid solvent to the nozzle discharge lines. After the delivery stroke of the pump is completed, the washer control valve automatically interrupts operation of the wipers.

Further objects and advantages of the present invention will be apparent from the following description, reference being had to the accompanying drawings wherein a preferred embodiment of the present invention is clearly shown.

In the drawings:

Fig. 3 is a composite diagrammatic and sectional view of a windshield cleaning apparatus.

Fig. 4 is a view, in elevation, of the control valve assembly.

Fig. 5 is an enlarged sectional view taken along line 5—5 of Fig. 4.

Fig. 7 is a sectional view taken along line 7—7 of Fig. 5.

Figs. 8 and 9 are fragmentary sectional views taken along lines 8—8 and 9—9, respectively, of Fig. 5.

Figure 1:
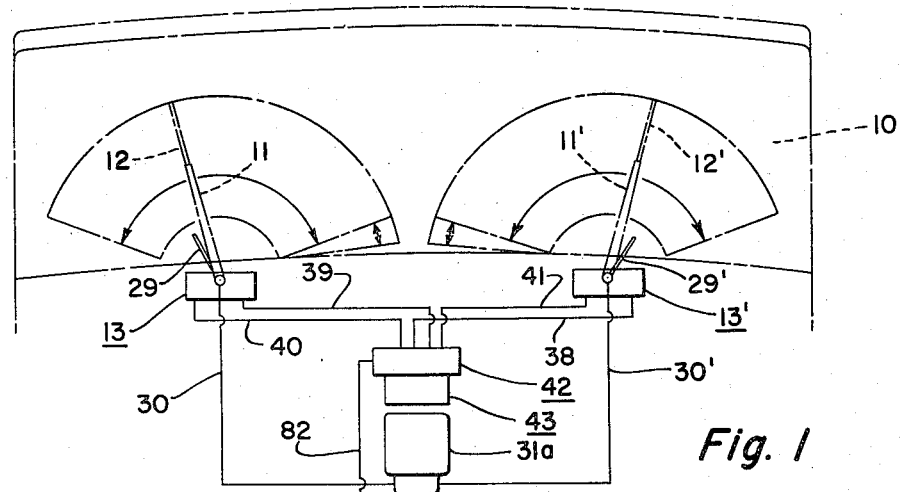
Fig. 1 is a diagrammatic view illustrating the windshield cleaning apparatus of this invention.

With particular reference to Fig. 1, a vehicle windshield is depicted by numeral 10. In accordance with conventional practice, the cleaning mechanism for the windshield 10 includes a pair of cleaner assemblies comprising wiper arms 11 and blades 12, disposed on opposite sides of the medial portion of the windshield and arranged for asymmetrical operation. Inasmuch as both cleaner assemblies are of identical design and construction, only one will be described, like parts of the other being indicated by like numerals with primes affixed.

Figure 2:
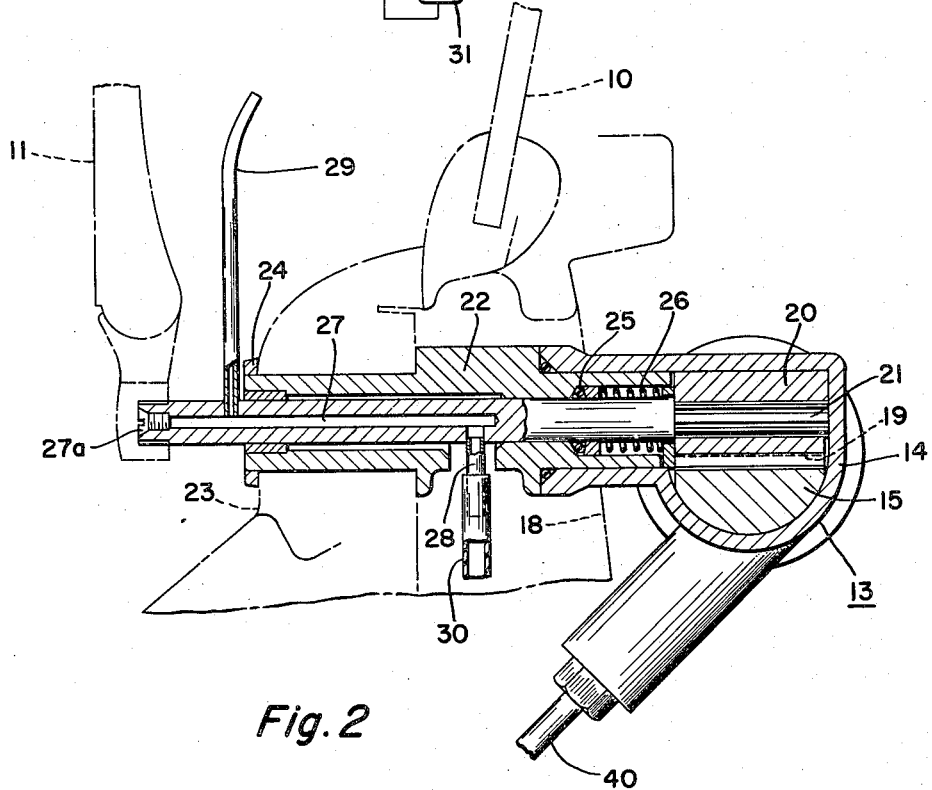
Fig. 2 is a fragmentary view, partly in section and partly in elevation, of a wiper motor illustrating the manner in which it is mounted in a vehicle.

Each cleaner assembly includes a hydraulic motor 13, which, as depicted in Fig. 2, is mounted on the passenger side of the vehicle firewall depicted by numeral 18. The motor unit 13 comprises a cylinder 14 having disposed therein a reciprocable piston 15 capable of fluid pressure actuation in both directions. As seen in Figs. 2 and 3, the piston 15 divides the cylinder 14 into an outboard chamber 16 and an inboard chamber 17. The piston is formed with an internal rack 19 that meshes with a sector gear 20 drivingly connected to a wiper actuating shaft 21.

The shaft 21 is rotatably journaled in a housing 22 which projects through an opening in the vehicle cowl 23, the housing being secured in place by a nut 24. A seal 25, disposed within the housing 22, engages the shaft 21, the seal 25 being loaded by a spring 26.

The shaft 21 is formed with a central bore 27, opposite ends of which connect with a radially extending filling 28 and a nozzle tube 29. The outer end of the bore 27 is closed by a screw 27a. As seen in Fig. 1, the nozzles 29 are angularly displaced from the arms 11 so as to lead movement of the arms and blades during the outboard stroke thereof, and lag movement of the arms and blades during the inboard stroke thereof. The nozzle 29 is connected through the shaft bore 27 and tube 28 to a flexible conduit 30, which communicates with a washer pump indicated generally by the numeral 31.

With particular reference to Figs. 2 and 3, motor chamber 16 communicates with a port 32 through a check valve passage 33 that is bypassed by a calibrated orifice 34. Similarly, motor chamber 17 communicates with a port 35 through a check valve passage 36 that is bypassed by a calibrated orifice 37. The control ports 32 and 35 of the motor 13 are connected to conduits 40 and 39, respectively, while the control ports 32' and 35' of motor 13' are connected to conduits 38 and 41. Conduits 38, 39, 40 and 41 are connected to a control valve assembly generally depicted by the numeral 42. The source of fluid pressure for actuating the motors 13 is generally depicted by the numeral 43. The control valve assembly 42 is connected by a conduit 82 to the washer pump 31. The liquid solvent reservoir is depicted by numeral 31a.

With particular reference to Figs. 3 through 9, the control valve assembly 42 will be described. The control valve assembly is enclosed in a three-part valve body comprising body sections 150 and 152 and an intermediate porting plate 151, which are connected by bolts 153, suitable gaskets 154 and 155 being interposed between the sections. High pressure fluid enters through line 69 and flows through passage 63 to bore 55 within which a control valve plunger 45 is disposed. The right-hand end of the bore 55 is closed by a plug 55a, the bore 55 also being connected to the exhaust line 66 wherein a pressure of substantially 15 p.s.i. is maintained by passage 61. The pressure in line 69 is preferably maintained at 125 p.s.i.

The manually positionable valve plunger 45 has lands 46 and 47, and a throttling land 48, axially spaced thereon. The stem of the plunger 45 is shown diagrammatically connected by a linkage, preferably a Bowden wire 49 to a dashboard knob 50 in Fig. 3. The knob 50 is normally maintained in the position indicated in Fig. 3 by a spring 51, one end of which acts upon the vehicle instrument panel 52 and the other end of which engages a washer 53 attached to the stem 54 of the knob 50. The plunger 45 is disposed within a bore 55 for reciprocable movement. The bore 55 connects with ports 56, 57, 58, 59 and 60, which connect, respectively, with passages 61, 62, 63, 64 and 65. Passage 62 connects with a pair of branch passages 67 and 68. Passage 63 connects with pressure line 69. Passage 64 connects with a port 70 of a servo actuated washer control valve 71. Passage 65 communicates through a check valved passage 72 with another port 73 of the washer control valve 71. Numeral 166 indicates a transversely extending pin which prevents the ball check valve 72 from moving out of its chamber 167.

Figure 6:
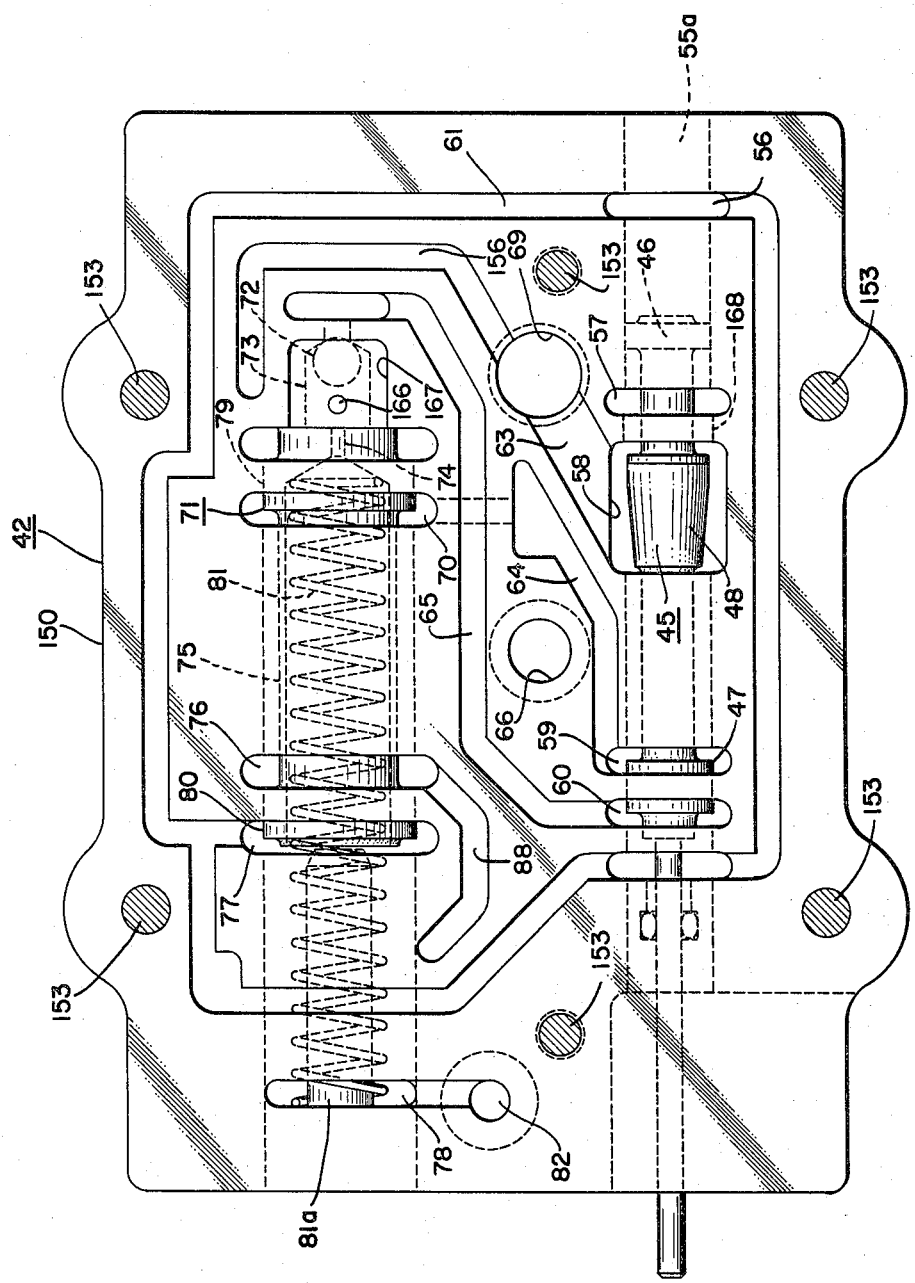
Fig. 6 is an enlarged sectional view taken along line 6—6 of Fig. 4.

The washer control valve 71 comprises a plunger having a calibrated orifice 74 in the head thereof. The plunger is disposed within a bore 75 having ports 70, 73, 76, 77 and 78, the plunger having axially spaced control lands 79 and 80. The plunger is normally biased by a spring 81 to the position indicated in Fig. 3, one end of the spring 81 engaging a seal 81a, as depicted in Fig. 6. The port 78 is connected to a conduti 82, which connects with a washer pump motor 83 comprising a cylinder 84 having disposed therein a reciprocable piston 85. The conduit 82 connects with a chamber 86 of the cylinder 84, and when pressure fluid is applied to the chamber 86, the piston 85 will move to the left, as viewed in Fig. 3. The piston 85 includes a rod 87, which may be connected to a suitable pump means, not shown, which may be of the type disclosed in the aforementioned copending application Serial No. 487,197. During fluid pressure actuation of the piston 85, a spring 87a is compressed so that upon connecting the chamber 86 to drain, the energy stored in the spring 87a will move the piston 85 to the right so as to effect the intake stroke of the pump means. During fluid pressure actuation of the motor piston 85, the delivery stroke of the pump is effected. Port 77 of the bore 75 connects with the exhaust pressure line 66, and port 76 communicates with a passage 88 having a restriction 89 therein.

Passages 67 and 68 connect with ports 90 and 91 of a reversing valve 92. The reversing valve 92 comprises a plunger 93 having axially spaced lands 94 and 95 and a pair of spaced V-shaped annular grooves 96 and 97. The plunger 93 is disposed within a bore 98 having ports 90, 91, 99, 100, 101, 102 and 103. Port 103 connects with the exhaust line 66 through chamber 157. Port 100 communicates through restrictions 104a and 104b with passages 158 and 159, while port 101 communicates through restrictions 105a and 105b with passages 160 and 161. Port 99 communicates with a passage 106, while port 102 communicates with a passage 107. The plunger 93 is capable of servo actuation in either direction, the plunger 93 being snapped from one end position to the other by an over-center spring toggle comprising a coil spring 108, opposite ends of which seat on balls 109 and 110. Ball 109 cooperates with the grooves 96 and 97 of the plunger 93.

Ball 110 cooperates with V-shaped annular grooves 111 and 112 of a pilot valve plunger 113. The pilot valve plunger 113 is disposed within a bore 114 for reciprocable movement and includes axially spaced lands 115 and 116. The central portion of the bore 114 communicates with the exhaust line 66 through the spring toggle chamber, and in the same manner, port 117 connects passages 118 and 119 to the exhaust line 66. Passage 118 has a restriction 120 therein and passage 119 has a restriction 121 therein. Land 115 cooperates with ports 122 and 123, while land 116 cooperates with ports 124 and 125. Port 122 is connected through a restriction 126 to passage 107, while port 124 is connected through a restriction 127 to passage 106. A pair of reaction plungers 128 and 129 are slidably mounted in opposite ends of the bore 114. The reaction plunger chambers are separated from the chamber of the plunger 113 by annular members 130 and 131, the members 130 and 131 slidably supporting pins 132 and 133, respectively. Lines 118 and 119 communicate with the head end chambers of the reaction plungers 128 and 129, respectively.

The reaction plunger 128 includes a large diameter head portion 134 and a smaller diameter rod portion 136. The large diameter head portion 134 cooperates with a port 138, which is connected to passage 164. The smaller diameter rod portion 136 cooperates with a port 140, which is also connected to passage 162. The reaction plunger 129 includes a large diameter head portion 141 and a small diameter rod portion 143, which cooperates with ports 135 and 137, respectively, these parts being connected to passages 165 and 163.

Operation of the windshield wiper is initiated by pushing the control knob 50 inwardly to either the slow or the fast position. This movement of the knob 50 will move the plunger 45 to the right, as viewed in Fig. 3, so that the tapered throttling land 48 thereof will be disposed in the enlarged section 168 of the bore 55. In the off position, the pressure line 69 is connected to two branches. One branch includes passage 63, port 58, bore 55, port 59, passage 64, port 70, bore 75, port 76, passage 88, reaction plunger 129, passage 119, port 117, and port 103 to the exhaust line 66. The other branch includes passage 63, ports 58 and 57, passages 62, 67 and 68, to the reversing valve 92 and then to motor chambers 16 and 16'. When the plunger 45 is moved to the right, land 47 covers the port 59 so as to block the connection of pressure line 69 to passages 64 and 88 to remove the pressure from reaction plunger 129, and throttling land 48 reduces the pressure of fluid flowing through port 58, the section 168 and through port 57 to passages 62, 67 and 68.

Accordingly, pressure fluid will be applied through ports 91 and 101 to passages 160 and 161 to motor chambers 16' and 16 through lines 38 and 40. Since the motor pistons 15 and 15' are in the parked position in engagement with the end walls of their cylinders 14 and 14', pressure will build up in passages 160 and 163, and passages 161 and 165, which pressure is communicated to port 137 and port 135 of the reaction plunger 129. Thus, the plunger 129 will move to the left and through pin 133 impart movement to the plunger 113 to the left. As soon as the plunger 113 is moved to the left so that the ball 110 is slightly more than one-half way between grooves 111 and 112, the toggle action of the spring 108 will immediately shift the plunger 113 with a snap action completely to the left and into engagement with annular member 130.

Pressure line 69 is connected with ports 123 and 125 of the pilot valve bore 114 through passage 156. Hence, upon movement of the pilot valve plunger 113 into engagement with the member 130, port 123 will be connected with passage 107 so as to apply pressure fluid to the right-hand chamber of the reversing valve 92. The pilot valve plunger 113 is hydraulically loaded to remain in the left-hand position throughout the outboard stroke of the motor pistons. Accordingly, the plunger 93 will move to the left, as viewed in Fig. 3, the over-center toggle spring effecting snap action movement thereof as soon as the ball 109 passes over the center of the ridge between grooves 96 and 97.

When the reversing valve plunger 93 is in the left-hand position, pressure fluid from line 68 flows through ports 90 and 100 to passages 158 and 159. Accordingly, pressure fluid is concurrently applied through the check valves 36 and 36' to the chambers 17 and 17' of the motors 13 and 13' through lines 39 and 41. Thus, the pistons 15 will be actuated on their outboard stroke. When the pistons 15 and 15' cover the calibrated bypass orifices 34 and 34', the pressure in chambers 17 and 17' will build up. The pressure build-up, as reflected in lines 39 and 41, as well as passages 158 and 156, will be transmitted to ports 138 and 140 of the reaction plunger 128 through passages 164 and 162. Thus, the plunger 128 will move to the right and cause movement of the pilot valve plunger 113 to the right through pin 132. Pilot valve plunger 113 moves to the right with a snap action due to the over-center toggle spring 108 to the position depicted in Fig. 3, where it will remain by hydraulic loading. This movement of the plunger 113 connects the left-hand chamber of plunger 93 to the pressure line 69 through port 99, passage 106, and port 125 whereupon the plunger 93 will move to the right. When plunger 93 is in the position depicted in Fig. 3, lines 38 and 40 are connected to the pressure line 69 through passage 67, ports 91 and 101 and passages 160 and 161, while lines 39 and 41 are connected to the exhaust line 66 through ports 100 and 103. Accordingly, the chambers 16 and 16' will be pressurized and the pistons will move throughout their inboard stroke. As long as the control valve plunger 45 is in either the slow or fast positions, the motor pistons will be maintained in a state of continuous reciprocation. The speed of the motors is controlled by the throttling land 48, since the further the plunger 45 is moved to the right, the less will be the pressure drop between line 69 and passage 63.

When the control valve plunger 45 is moved to the position depicted in Fig. 3, operation of the motors will automatically be interrupted with the blades at the parked position out of the normal wiping stroke. This is accomplished in the following manner. Irrespective of the position of the pilot valve plunger 113, or the reversing valve plunger 93, when the plunger 45 is moved to the off position, the pressure line 69 is connected to the drain line 66 through ports 58 and 59, passage 64, ports 70 and 76, and lines 88 and 119. Thus, reaction plunger 129 is moved to the position depicted in Fig. 3 by reason of pressure fluid acting on the left-hand surface of the head portion 141. Pressure acting on the left-hand head surface of the plunger 129 prevents movement thereof to the left. Accordingly, when pressure fluid is applied to chambers 16 and 16' of the motors 13 and 13', the pressure buildup adjacent the end of the normal wiping stroke will not be able to move plunger 129 to the left whereupon the pistons will continue to move into engagement with the end walls of their cylinders. Therefore, the blades will come to rest in the parked position outside of the normal wiping stroke since the pilot valve plunger 113 will not be moved to the left so as to actuate the reversing valve 92. The pistons will remain in the parked position with the chambers 16 and 16' pressurized by virtue of the reversing valve 92 remaining in the position depicted in Fig. 3.

To initiate the wash cycle, the knob 50 is pulled outwardly, thereby moving the plunger 45 to a position where port 60 is uncovered. When port 60 is uncovered, pressure fluid from line 69 is admitted through passage 63, port 58 and port 60 to passage 65 and, thence, to the right-hand end of the bore 75 and the check valve 72 and port 73. The application of pressure to the right-hand end of bore 75 results in movement of the plunger 71 to the left due to the pressure differential, thereby closing port 70 and cutting off the parking pressure to the reaction plunger 129. Movement of the plunger 71 to the left also closes port 77 so that fluid under pressure passing through orifice 74 flows through port 78 and conduit 82 to the motor pump chamber 86 so as to move the piston 85 to the left compressing spring 87a and initiating the delivery stroke of the washer pump means, not shown. The knob 50 need only be maintained momentarily in the wash position and when released, pressure fluid flowing through port 70 will continue to move the plunger 71 to the left to complete the delivery stroke of the washer pump means. At the same time, since parking pressure has been interrupted to the reaction plunger 129 by reason of interruption of the connection of ports 70 and 76, the motors 13 and 13' will be actuated and, hence, the wiper blades 12 and 12' will be oscillated throughout their normal wiping stroke while liquid solvent is discharged onto the windshield through the nozzles 29 and 29'. Upon completion of the delivery stroke of the pump means, the total fluid pressures acting on opposite sides of the plunger 71 will become equal and the spring 81 will cause the valve to move slowly to the right forcing fluid through the orifice 74, while spring 87a effects the intake stroke of the pump means. When the valve plunger 71 again connects ports 70 and 76, parking pressure will be applied to the reaction plunger 129 so as to interrupt operation of the wiper motors and effect parking thereof.

While the embodiment of the present invention as herein disclosed, constitutes a preferred form, it is to be understood that other forms might be adopted.

What is claimed is as follows:

1. Actuating mechanism for a windshield wiper including, a fluid motor for actuating said wiper having a movable member operatively connected to said wiper, said movable member being capable of fluid pressure actuation in both directions, and reversing means for controlling the application of fluid pressure to opposite sides of said movable member to maintain said member in a state of continuous movement, said reversing means including a reciprocable pilot valve, a pair of oppositely acting reaction plungers responsive to the pressure increase on opposite sides of said movable motor member as said motor member approaches the ends of its movement for shifting said pilot valve, a reciprocable reversing valve operatively connected to said pilot valve so as to follow up movement of said pilot valve and means for effecting snap action movement of said reversing valve.

2. Actuating mechanism for a windshield wiper including, a fluid motor for actuating said wiper having a movable member operatively connected to said wiper, said movable member being capable of fluid pressure actuation in both directions, and reversing means for controlling the application of fluid pressure to opposite sides of said movable member to maintain said member in a state of continuous movement, said reversing means including a reciprocable pilot valve, a pair of oppositely acting reaction plungers engageable with said pilot valve for shifting it in opposite directions and responsive to the pressure increase on opposite sides of the movable motor member as said movable member approaches the ends of its strokes for shifting said pilot valve, fluid pressure means for maintaining said pilot valve in position during the remaining portions of the strokes of said motor member and a reciprocable reversing valve mechanically connected to said pilot valve so as to follow up the movements thereof.

3. Actuating mechanism for a windshield wiper including, a fluid motor for actuating said wiper having a movable member operatively connected to said wiper, said movable member being capable of fluid pressure actuation in both directions, and reversing means for controlling the application of fluid pressure to opposite sides of said movable member to maintain said member in a state of continuous movement, said reversing valve means including a reciprocable pilot valve, a pair of oppositely acting reaction plungers responsive to the pressure increase on opposite sides of said movable motor member as said motor member approaches the ends of its movement for shifting said pilot valve and a reciprocable reversing valve mechanically connected to said pilot valve so as to follow the movement of said pilot valve.

4. Actuating mechanism for a windshield wiper including, a fluid motor for actuating said wiper having a movable member operatively connected to said wiper, said movable member being capable of fluid pressure actuation in both directions, and reversing means for controlling the application of fluid pressure to opposite sides of said movable member to maintain said member in a state of continuous movement, said reversing means including a reciprocable pilot valve, a pair of oppositely acting reaction plungers responsive to the pressure increase on opposite sides of said movable motor member as said motor member approaches the ends of its strokes for shifting said pilot valve, fluid pressure means for maintaining said pilot valve in position during the remaining portions of the strokes of said motor member, a reciprocable reversing valve operatively connected to said pilot valve so as to follow-up the movements thereof and means for effecting snap action of said reversing valve.

5. Actuating mechanism for a windshield wiper including, a fluid motor for actuating said wiper having a movable member operatively connected to said wiper, said movable member being capable of fluid pressure actuation in both directions, and reversing means for controlling the application of fluid pressure to opposite sides of said movable member to maintain said member in a state of continuous movement, said reversing means including a reciprocable pilot valve, means responsive to the pressure increase on opposite sides of said movable motor member as said motor member approaches the ends of its movement for shifting said pilot valve, a servo actuated, reciprocable reversing valve, the actuation of said reversing valve being controlled by said pilot valve so as to follow-up movement of said pilot valve and toggle action spring means operatively connecting said valves for effecting snap action movement thereof.

6. Actuating mechanism for a windshield wiper including, a fluid motor for actuating said wiper having a movable member operatively connected to said wiper, said movable member being capable of fluid pressure actuation in both directions, reversing means for controlling the application of fluid pressure to opposite sides of said movable member to maintain said member in a state of continuous movement, said reversing means including a reciprocable pilot valve, means responsive to the pressure increase on opposite sides of said movable motor member as said motor member approaches the ends of its movement for shifting said pilot valve and a reciprocable reversing valve operatively connected to said pilot valve so as to follow up movements thereof and means for effecting snap action movement of said reversing valve, and a manually positionable valve for throttling the application of pressure fluid to said reversing valve to control the speed of movement of said motor member.

7. Actuating mechanism for a windshield wiper including, a fluid motor for actuating said wiper having a movable member operatively connected to said wiper, said movable member being capable of fluid pressure actuation in both directions, reversing means for controlling the application of fluid pressure to opposite sides of said movable member to maintain said member in a state of continuous movement, said reversing means including a reciprocable pilot valve, a pair of oppositely acting reaction plungers responsive to the pressure increase on opposite sides of said movable motor member as said motor member approaches the ends of its movement for shifting said pilot valve, and a reciprocable reversing valve operatively connected to said pilot valve so as to follow-up the movements thereof, and means for applying pressure to one of said reaction plungers acting in opposition to the pressure increase caused by said motor member approaching one end of its movement so as to disable said reversing means and cause said motor member to move to a parked position.

8. Actuating mechanism for a windshield wiper including, a fluid motor for actuating said wiper having a movable member operatively connected to said wiper, said movable member being capable of fluid pressure actuation in both directions, reversing means for controlling the application of fluid pressure to opposite sides of said movable member to maintain said member in a state of continuous movement, said reversing means including a reciprocable pilot valve, a pair of oppositely acting reaction plungers responsive to the pressure increase on opposite sides of said movable member as said motor member approaches the ends of its movement for shifting said pilot valve and a reciprocable reversing valve operatively connected to said pilot valve so as to follow-up the movements thereof, and a manually positionable valve including means for throttling the flow of pressure fluid to said reversing valve to control motor speed and means for applying pressure fluid to one of said reaction plungers in opposition to the pressure applied to said plunger due to movement of said motor member towards one end of its movement so as to disable said reversing means and cause the motor member to move to a parked position beyond its normal stroke.

9. In combination with a vehicle having a pair of wipers, a fluid motor for each wiper including a cylinder having disposed therein a reciprocable piston capable of fluid pressure actuation in both directions, each piston being operatively connected to one wiper and dividing its respective cylinder into an inboard chamber and an outboard chamber, conduit means interconnecting the inboard chambers of both motors, conduit means interconnecting the outboard chambers of both motors, the connection between each motor chamber and each conduit means including a check valved passage bypassed by a calibrated orifice, the construction and arrangement being such that the calibrated orifice is closed by the piston adjacent each end of its normal wiping stroke whereby the pressure in the opposite motor chamber will increase, and reversing means for controlling the simultaneous application of pressure fluid to either both inboard or both outboard motor chambers through said conduit means so as to maintain the pistons in a state of continuous and synchronized reciprocation, said reversing means including a reciprocable pilot valve, a pair of oppositely acting reaction pistons having connection with and responsive to the pressure increase in said motor chambers for shifting said pilot valve and a reciprocable reversing valve mechanically connected to said pilot valve so as to follow-up the movements thereof.

10. In combination with a vehicle having a pair of wipers, a fluid motor for each wiper including a cylinder having disposed therein a reciprocable piston capable of fluid pressure actuation in both directions, each piston being operatively connected to one wiper and dividing its respective cylinder into an inboard chamber and an outboard chamber, conduit means interconnecting the inboard chambers of both motors, conduit means interconnecting the outboard chambers of both motors, the connection between each motor chamber and each conduit means including a check valved passage bypassed by a calibrated orifice, the construction and arrangement being such that the calibrated orifice is closed by the piston adjacent each end of it normal wiping stroke whereby the pressure in the opposite motor chamber will increase, reversing means for controlling the simultaneous application of pressure fluid to either both inboard or both outboard motor chambers through said conduit means so as to maintain the pistons in a state of continuous and synchronized reciprocation, said reversing means including a reciprocable pilot valve, a pair of oppositely acting reaction pistons having connection with and responsive to the pressure increase in said motor chambers for shifting said pilot valve and a reciprocable reversing valve operatively connected to said pilot valve so as to follow up the movements thereof, and manual valve means for controlling operation of said wiper motors, said manual valve means being operable to apply pressure fluid to one of said reaction pistons in opposition to the pressure increase caused by said piston adjacent one end of their normal wiping strokes so as to render the reversing means inoperative and cause the motor pistons to move to a parked position beyond one end of their normal wiping strokes.

11. In combination, a fluid pressure operated wiper motor having a movable member capable of fluid pressure actuation in both directions, reversing means for controlling the application of fluid pressure to opposite sides of said movable member to maintain the member in a state of continuous movement, a washer pump motor having an intake stroke and a delivery stroke, a manual control valve operatively connected to the reversing means for selectively rendering said reversing means operative or inoperative, a servo valve, means interconnecting the manual control valve and the servo valve when said manual control valve is moved to a predetermined position for initiating operation of said washer pump motor and rendering said reversing means operative to initiate operation of said wiper motor, and means for repositioning said servo valve upon completion of the delivery stroke of said washer pump motor so as to interrupt operation of said wiper motor.

12. A joint control for a windshield wiper motor and a washer pump motor, said washer pump motor having a delivery stroke and an intake stroke, including in combination, a manual control member, means actuated upon a predetermined movement of said control member to initiate the delivery stroke of said washer pump motor and control operation of said wiper motor, and means controlled by said first recited means for completing the delivery stroke of said washer pump motor and, thereafter, interrupting operation of said wiper motor.

13. A joint control for a fluid pressure operated wiper motor and a washer pump motor, said washer pump motor having a fluid pressure actuated delivery stroke, including in combination, a manual control valve, means actuated upon a first predetermined movement of said valve to control the application of fluid pressure to said washer pump motor and to said wiper motor, and means actuated by a second predetermined movement of said member for controlling the application of fluid pressure to only said wiper motor.

14. A joint control for a fluid pressure operated windshield wiper motor and a washer pump motor, said washer pump motor having a fluid pressure actuated delivery stroke, including in combination, a manual control valve, means actuated by a predetermined movement of said control valve to control the application of fluid pressure to said washer pump motor and said wiper motor, and means controlled by said first recited means to continue controlling the application of pressure fluid to said wiper motor until the delivery stroke of said washer pump motor is completed and, thereafter, automatically interrupt the application of pressure fluid to said wiper motor.

15. A joint control for a fluid pressure operated windshield wiper motor and a washer pump motor having a fluid pressure actuated delivery stroke, including in combination, a manual control valve, a servo actuated valve, means actuated upon movement of said manual control valve to a predetermined position for actuating said servo valve, said servo valve when actuated initiating the delivery stroke of said washer pump and controlling operation of said wiper motor, and means for repositioning said servo valve upon completion of the delivery stroke of said washer pump so as to interrupt operation of said wiper motor.

16. A joint control for a fluid pressure operated windshield wiper motor and a washer pump motor having a fluid pressure actuated delivery stroke and a spring actuated intake stroke, including in combination, a manual control valve, a servo valve, means for moving said manual control valve to a first position wherein operation of only said wiper motor is effected, and means for moving said manual valve to a second position wherein said servo valve is actuated, said servo valve when actuated initiating the delivery stroke of said washer pump and controlling operation of said wiper motor.

17. A joint control for a fluid pressure operated windshield wiper motor and a washer pump motor having a fluid pressure actuated delivery stroke, including in combination, a manual control valve, a spring biased servo valve, means for positioning said manual control valve to establish a connection between said manual control valve and said servo valve so as to effect movement of said servo valve, and means controlled by movement of said servo valve for initiating the delivery stroke of said washer pump motor and effecting operation of said wiper motor.

18. A joint control for a fluid pressure operated windshield wiper motor and a washer pump motor having a fluid pressure actuated delivery stroke and a spring actuated intake stroke, including in combination, a manual control valve, servo valve, means for moving said manual control valve to a position establishing a connection between said manual control valve and said servo valve to initiate movement of said servo valve in one direction, means actuated by initial movement of said servo valve in said one direction for continuing movement thereof in said one direction to effect operation of said wiper motor and initiate the delivery stroke of said washer pump motor, and means operable upon completion of the delivery stroke of said washer pump motor for moving said servo valve in the opposite direction so as to interrupt operation of said wiper motor.

19. In combination, a fluid pressure operated wiper motor having a movable member capable of fluid pressure actuation in both directions, reversing means for controlling the application of fluid pressure to opposite sides of said movable member to maintain the member in a state of continuous movement, a washer pump motor having a fluid pressure actuated delivery stroke, a manual control valve operatively connected to said reversing means for selectively rendering said reversing means operative or inoperative, a servo valve, and means interconnecting said manual control valve and said servo valve when said manual control valve is moved to a predetermined position for initiating the delivery stroke of said washer pump motor and rendering said reversing means operative to effect operation of said wiper motor.

References Cited in the file of this patent

UNITED STATES PATENTS

| | | |
|---|---|---|
| 802,104 | Howard | Oct. 17, 1905 |
| 885,459 | Engler et al. | Apr. 21, 1908 |
| 2,192,402 | Gruetjen | Mar. 5, 1940 |
| 2,206,814 | Horton | July 2, 1940 |
| 2,609,795 | Freedman et al. | Sept. 9, 1952 |
| 2,617,136 | Rappl | Nov. 11, 1952 |
| 2,702,918 | Neufeld | Mar. 1, 1955 |
| 2,743,473 | Oishei | May 1, 1956 |

FOREIGN PATENTS

| | | |
|---|---|---|
| 1,082,258 | France | June 16, 1954 |